(12) United States Patent
Chen (10) Patent No.: US 11,541,632 B2
(45) Date of Patent: Jan. 3, 2023

(54) PROTECTIVE FILM AND METHOD FOR PEELING RELEASE LAYER THEREOF

(71) Applicant: JIANGMEN IGUARDER ELECTRONIC CO., LTD., Guangdong (CN)

(72) Inventor: Haiying Chen, Jiangmen (CN)

(73) Assignee: JIANGMEN IGUARDER ELECTRONIC CO., LTD., Guangdong (CN)

(*) Notice: Subject to any disclaimer, the term of this patent is extended or adjusted under 35 U.S.C. 154(b) by 0 days.

(21) Appl. No.: 17/261,254

(22) PCT Filed: Dec. 28, 2018

(86) PCT No.: PCT/CN2018/124668
§ 371 (c)(1),
(2) Date: Jan. 19, 2021

(87) PCT Pub. No.: WO2020/098108
PCT Pub. Date: May 22, 2020

(65) Prior Publication Data
US 2021/0268768 A1    Sep. 2, 2021

(30) Foreign Application Priority Data

Nov. 14, 2018  (CN) .......................... 201811363449.9

(51) Int. Cl.
*B32B 7/06* (2019.01)
*B32B 38/10* (2006.01)
(Continued)

(52) U.S. Cl.
CPC ................ *B32B 7/06* (2013.01); *B29C 63/02* (2013.01); *B32B 37/26* (2013.01); *B32B 38/10* (2013.01);
(Continued)

(58) Field of Classification Search
CPC ............ B29C 2063/0008; B29C 63/02; B29C 63/024; B29C 63/095; B29C 65/7808;
(Continued)

(56) References Cited

U.S. PATENT DOCUMENTS 9,580,626 B2 * 2/2017 Colby ................... B32B 27/283
9,902,111 B2 * 2/2018 Wadsworth ............. B32B 37/26
(Continued)

FOREIGN PATENT DOCUMENTS

CN      202987565 U    6/2013
CN      204250612 U    4/2015
(Continued)

OTHER PUBLICATIONS

International Search Report and Written Opinion from PCT/CN2018/124668 and English translation, dated Jul. 29, 2019 (9 pages).
(Continued)

*Primary Examiner* — Philip C Tucker
*Assistant Examiner* — Brian R Slawski
(74) *Attorney, Agent, or Firm* — Ware, Fressola, Maguire & Barber LLP (57) ABSTRACT

Disclosed is a protective film, which includes: a protective film sheet; a protective layer; and a release layer, a lead tab is connected to an end part of the release layer, and a
(Continued)

positioning mechanism is arranged on the protective layer to align the protective film sheet with a screen of an electronic device.

8 Claims, 11 Drawing Sheets

(51) Int. Cl.

| | | |
|---|---|---|
| B32B 37/26 | (2006.01) | |
| B32B 38/18 | (2006.01) | |
| B29C 63/02 | (2006.01) | |
| B32B 43/00 | (2006.01) | |
| B29L 31/34 | (2006.01) | |
| B29C 63/00 | (2006.01) | |
| B29C 65/00 | (2006.01) | |
| B29C 65/78 | (2006.01) | |
| B29C 65/48 | (2006.01) | |

(52) U.S. Cl.
CPC ........ *B32B 38/1833* (2013.01); *B32B 43/006* (2013.01); *B29C 65/4825* (2013.01); *B29C 65/7808* (2013.01); *B29C 66/45* (2013.01); *B29C 66/8362* (2013.01); *B29C 66/861* (2013.01); *B29C 2063/0008* (2013.01); *B29L 2031/3437* (2013.01); *B29L 2031/3475* (2013.01); *B32B 2571/00* (2013.01)

(58) Field of Classification Search
CPC ..... B29C 65/48; B29C 65/4825; B29C 66/45; B29C 66/836; B29C 66/8362; B29C 66/861; B29L 2031/3437; B29L 2031/3475; B32B 2457/20; B32B 2571/00; B32B 27/08; B32B 33/00; B32B 37/26; B32B 38/10; B32B 38/1833; B32B 43/006; B32B 7/06
USPC ......... 156/60, 184, 191, 192, 230, 247, 249, 156/289; 428/41.7, 41.1, 343, 354
See application file for complete search history.

(56) References Cited

U.S. PATENT DOCUMENTS

| | | | |
|---|---|---|---|
| 2012/0211170 A1* | 8/2012 | Patel | B29C 63/0004 156/538 |
| 2013/0048203 A1 | 2/2013 | Yau et al. | |
| 2015/0013890 A1* | 1/2015 | Rostami | B29C 63/0004 29/760 |
| 2015/0041069 A1* | 2/2015 | Wadsworth | B29C 63/0004 156/247 |
| 2015/0314523 A1* | 11/2015 | Mason | B29C 63/0004 156/247 |
| 2016/0288470 A1 | 10/2016 | Wadsworth | |
| 2017/0274635 A1* | 9/2017 | Lin | B29C 63/0056 |
| 2018/0117892 A1* | 5/2018 | Hoshikawa | B29C 63/02 |
| 2018/0145715 A1* | 5/2018 | Abadi | H04B 1/3888 |
| 2020/0064883 A1* | 2/2020 | Schwenke | G06F 1/1609 |

FOREIGN PATENT DOCUMENTS

| | | | |
|---|---|---|---|
| CN | 204750661 U | 11/2015 | |
| CN | 105416661 A | 3/2016 | |
| CN | 105829070 A | 8/2016 | |
| DE | 202013102944 U1 * | 11/2013 | ............. B29C 63/02 |
| JP | H07281166 A | 10/1995 | |
| JP | 2017161575 A | 9/2017 | |
| KR | 101475650 B1 | 12/2014 | |
| WO | 2015038883 A1 | 3/2015 | |
| WO | 2016166803 A1 | 10/2016 | |

OTHER PUBLICATIONS

Decision of Refusal, Japanese Application No. 2020-573459 and English translation, dated Jul. 2022 (7 pages).
Notice of Reasons for Refusal, Japanese Application No. 2020-573459 and English translation, dated Dec. 2021 (12 pages).
Examination Report, Australian Application No. 2018449780, dated Sep. 6, 2021 (3 pages).
European Search Report, European Application No. 18 940 443.7, dated Aug. 4, 2021 (3 pages).

\* cited by examiner

PROTECTIVE FILM AND METHOD FOR PEELING RELEASE LAYER THEREOF

CROSS-REFERENCE TO RELATED APPLICATIONS

This application is a national stage filing under 35 U.S.C. § 371 of international application number PCT/CN2018/124668, filed Dec. 28, 2018, which claims priority to Chinese patent application No. 201811363449.9, filed Nov. 14, 2018. The contents of these applications are incorporated herein by reference in their entirety.

TECHNICAL FIELD

The present disclosure relates to the field of film pasting technologies for electronic devices, and more particularly, to a protective film and a method for peeling a release layer thereof.

BACKGROUND

The use of electronic devices is becoming more and more popular in modern society, and these kinds of intelligent electronic devices are usually provided with a screen, which generally has a touch function. Keys on the screen are touched to communicate or menus are touched to get information through a conductive characteristic of fingers. In order to prevent a screen surface from being often touched or damaged by external friction or collision, it is necessary to paste a protective film on the screen.

A current protective film is generally a hard protective film with a high strength, such as a tempered glass film, which is hard in texture and has a strong adhesion. The protective film generally comprises a protective film sheet adhered with glue on one face for pasting on the screen surface, a release layer attached to an adhesive end of the protective film sheet, and a protective layer attached to the other end of the protective film sheet. The protective film with this structure cannot be positioned, and the release layer of the protective film is not easy to peel, so that the quality of film pasting cannot be guaranteed. Therefore, the current protective film is not suitable for matching with a film pasting machine.

SUMMARY

Aiming at the problems in the existing technology, the present disclosure aims to provide a protective film, which is matched with a film pasting machine and has a high precision of film pasting and good effects; and the present disclosure further aims to provide a method for peeling a release layer of a protective film, thereby making the peeling smooth and highly efficient.

A protective film includes a protective film sheet, a protective layer and a release layer, wherein a lead tab is connected to an end part of the release layer, and a positioning mechanism is arranged on the protective layer to align the protective film sheet with a screen of an electronic device.

As a further improvement of the above technical scheme, the lead tab includes a first layer and a second layer, one end of the release layer is sandwiched between the first layer and the second layer, and one end of the lead tab matched with the release layer is offset from a boundary of the protective film sheet.

As a further improvement of the above technical scheme, an aligning mechanism is arranged on the lead tab.

As a further improvement of the above technical scheme, the aligning mechanism is arranged at one end of the lead tab away from the release layer.

As a further improvement of the above technical scheme, the positioning mechanism includes a plurality of positioning holes arranged at intervals along a periphery of the protective film sheet for positioning the protective film.

As a further improvement of the above technical scheme, the plurality of positioning holes are asymmetrically arranged with each other.

As a further improvement of the above technical scheme, the plurality of positioning holes comprise at least two diameters and are arranged in an array with each other.

A method for peeling a release layer of a protective film includes:

providing a positioning device, the positioning device being matched with a positioning mechanism to position the protective film;

providing a peeling device, the peeling device peeling a lead tab from the protective film; and the peeling device moving relative to the protective film to peel the release layer from the protective film sheet.

As a further improvement of the above technical scheme, the peeling device moving relative to the protective film to peel the release layer from the protective film sheet includes: the peeling device moving relative to one end of the protective film sheet away from the lead tab and pressing down the release layer to peel the release layer from the protective film sheet.

As a further improvement of the above technical scheme, the peeling device moving relative to the protective film to peel the release layer from the protective film sheet includes: the peeling device moving relative to one end of the protective film sheet away from the lead tab and rolling up the release layer to peel the release layer from the protective film sheet.

The present disclosure has the beneficial effects that: compared with the existing technology, the protective film provided in the present disclosure is provided with the lead tab connected to the end part of the release layer, thereby facilitating peeling the release layer from the protective film, implementing smooth peeling, and increasing an efficiency. Moreover, the positioning mechanism is arranged on the protective layer of the protective film to align the protective film sheet with the screen of the electronic device. The protective film is used in tandem with the film pasting machine, which provides highly precise film pasting and great film pasting effects. According to the method for peeling the release layer of the protective film provided in the present disclosure, the positioning device is employed to position the protective film, the peeling device peels the lead tab from the protective film and then moves relative to the protective film to peel the release layer from the protective film sheet, and a process of peeling the release layer is smoother and more efficient, thereby further increasing an efficiency and the quality of film pasting.

DETAILED DESCRIPTION

Figure 1:
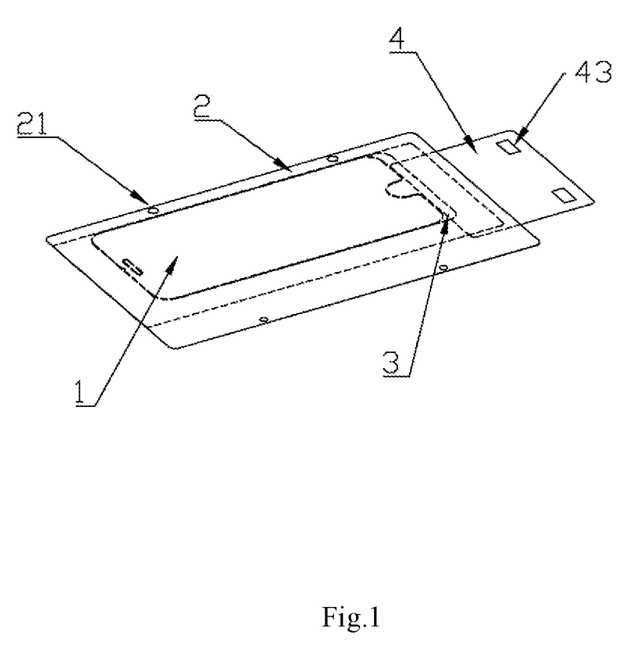
FIG. 1 is a structure diagram of a protective film according to an embodiment of the present disclosure.
Figure 2:
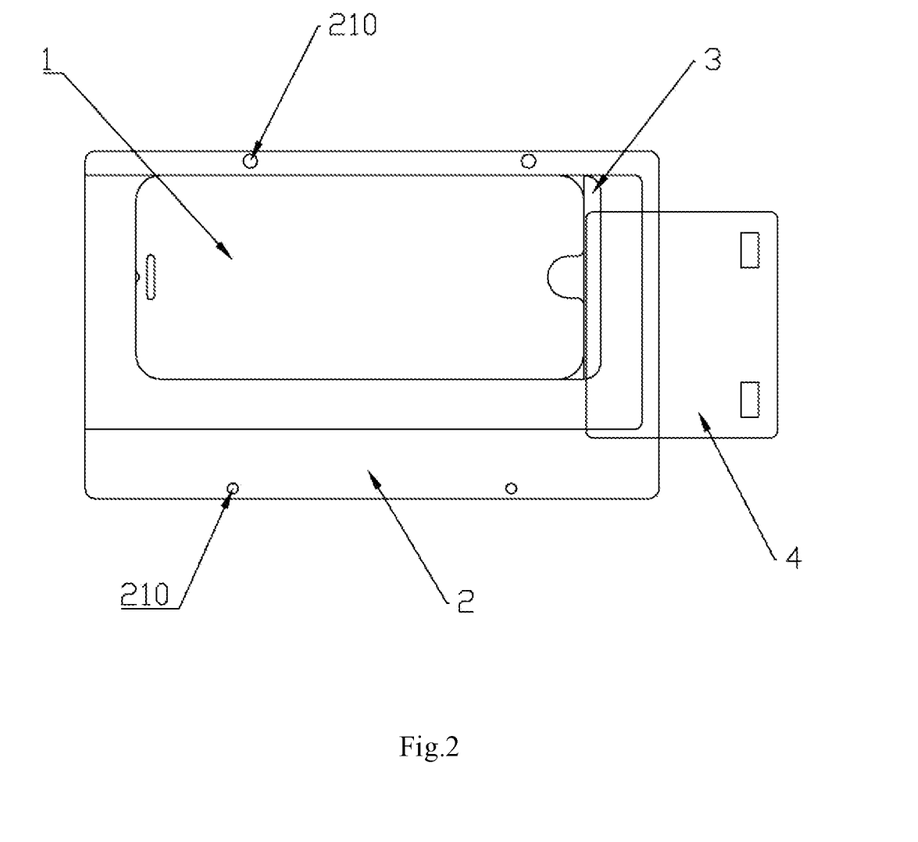
FIG. 2 is a top view of the embodiment of FIG. 1.
Figure 3:
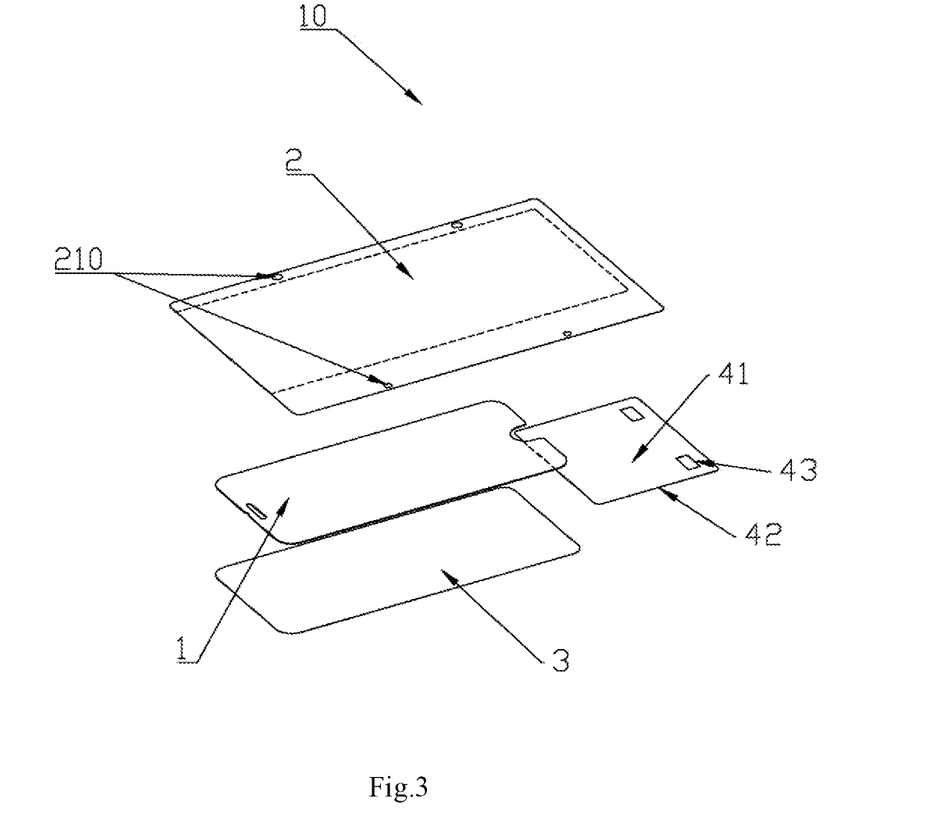
FIG. 3 is an exploded view of the embodiment of FIG. 1.

Referring to FIG. 1 and FIG. 2, a protective film according to an embodiment of the present disclosure includes a protective film sheet 1, a protective layer 2 and a release layer 3. The protective layer 2 is provided with a positioning mechanism 21 to align the protective film sheet 1 with a screen of an electronic device. The protective film is used in tandem with a film pasting machine, so as to ensure that the protective film sheet 1 is precisely pasted on the screen of the electronic device. As shown in FIG. 3, the positioning mechanism 21 includes a plurality of positioning holes 210 arranged at intervals along a periphery of the protective film sheet 1 for positioning the protective film 10, and the positioning holes 210 are matched with a positioning device 20 to position the protective film 10, so that the positioning is precise and stable. In the embodiment, four positioning holes 210 are provided, which meet a use requirement of a general mobile phone protective film. In addition, a lead tab 4 is connected to an end part of the release layer 3 attached to the protective film sheet 1, which facilitates driving the release layer 3 to be peeled from the protective film sheet 1 during film pasting, so that the peeling is smoother and more efficient.

In some embodiments of the present disclosure, the plurality of positioning holes 210 comprise at least two diameters, and the positioning holes 210 of the two diameters are arranged in an array with each other, which facilitates distinguishing a positioning direction of the protective film 10. Preferably, the plurality of positioning holes 210 are asymmetrically arranged with each other, or are distributed in a staggered manner, thereby further ensuring that the protective film 10 is in a correct positioning direction when in use.

In some embodiments of the present disclosure, a boundary of the protective layer 2 is larger than a boundary of the protective film sheet 1 as a whole, which facilitates arranging the positioning holes 210 in the protective layer 2 to position the protective film 10. As another embodiment, the protective layer 2 may also be attached with a positioning layer having the positioning holes 210 to position the protective film 10.

In some embodiments of the present disclosure, the lead tab 4 includes a first layer 41 and a second layer 42, and one end of the release layer 3 is sandwiched between the first layer 41 and the second layer 42, so that the connection is more stable. Preferably, one end of the lead tab 4 matched with the release layer 3 is offset from the boundary of the protective film sheet 1, and the lead tab 4 and the release layer 3 do not coincide with each other and have a small gap, which can ensure stable attachment of an area where the release layer 3 is matched with the protective film sheet 1 when the protective film 10 is not in use.

In some embodiments of the present disclosure, the lead tab 4 is a hard layer, which is less prone to deformation than the release layer 3. When the lead tab 4 is peeled from the protective film 10, the release layer 3 will have a bending and deformation tendency, so that the release layer 3 is peeled from the protective film sheet 1 more easily.

Figure 11:
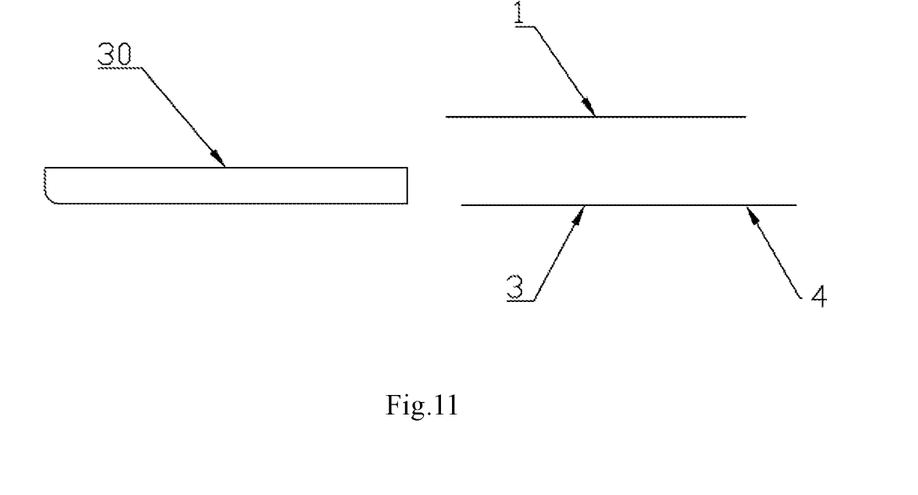
FIG. 11 is a front view of the embodiment of FIG. 10.
Figure 12:
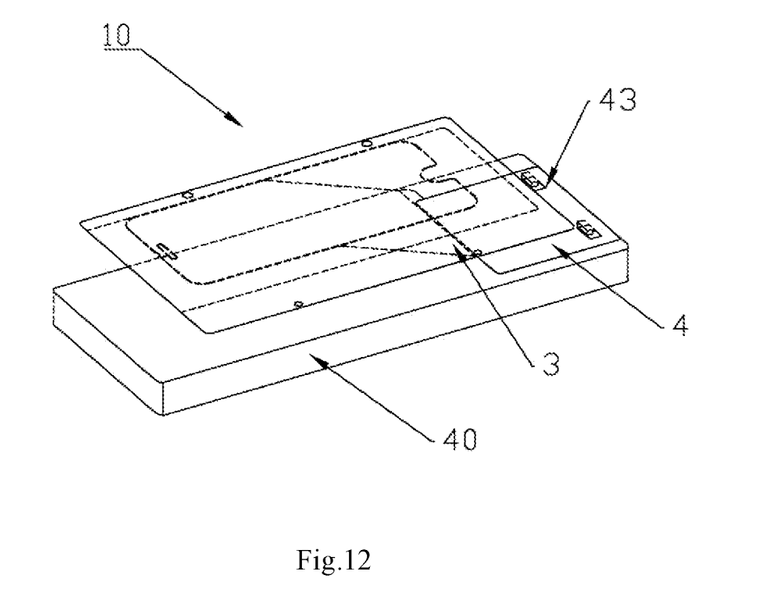
FIG. 12 is a schematic diagram of a state of an aligning machine in an implementation manner according to an embodiment of the present disclosure.

In some embodiments of the present disclosure, the lead tab 4 is provided with an aligning mechanism 43. As shown in FIG. 11, during a process of peeling the release layer 3, the lead tab 4 and the release layer 3 may be positioned by means of an aligning device 40 matched with the aligning mechanism 43, and the release layer 3 is collected. Preferably, the aligning mechanism 43 is arranged at one end of the lead tab 4 away from the release layer 3, and positions the lead tab 4 before the release layer 3 is peeled, thereby avoiding the release layer 3 from disengagement or bending and jumping during peeling, which affects the quality of peeling.

In some embodiments of the present disclosure, a dimension of the release layer 3 in a width direction is basically the same as that of the protective film sheet 1, and a dimension of the release layer in a length direction is larger than that of the protective film sheet 1. the lead tab 4 is connected to the end part of the release layer 3 attached to the protective film sheet, which facilitates driving the release layer 3 to be peeled along a length direction of the protective film sheet 1 during film pasting, so that the peeling is smoother and more efficient. In addition, the lead tab 4 may also be arranged at one end of the release layer 3 in the width direction, which facilitates peeling the release layer 3 along the width direction thereof.

Figure 4:
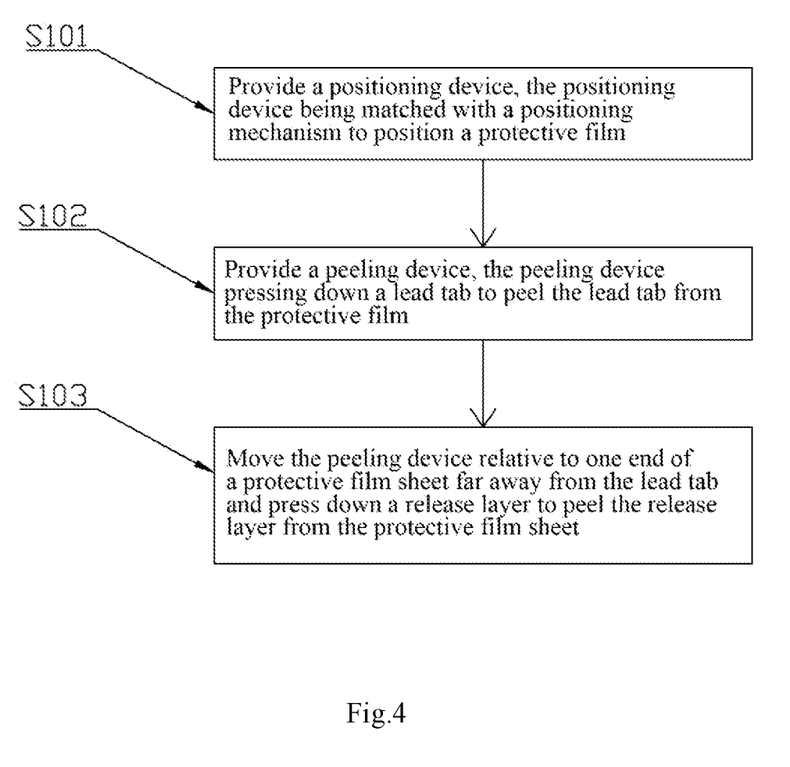
FIG. 4 is a flow chart of a method for peeling a release layer of a protective film according to an embodiment of the present disclosure.

FIG. 4 shows a method for peeling a release layer of a protective film according to an embodiment of the present disclosure. The method includes the following steps.

In a step of S101, a positioning device 20 is provided, and the positioning device 20 is matched with a positioning mechanism 21 to position the protective film 10, as shown in FIG. 4.

Figure 5:
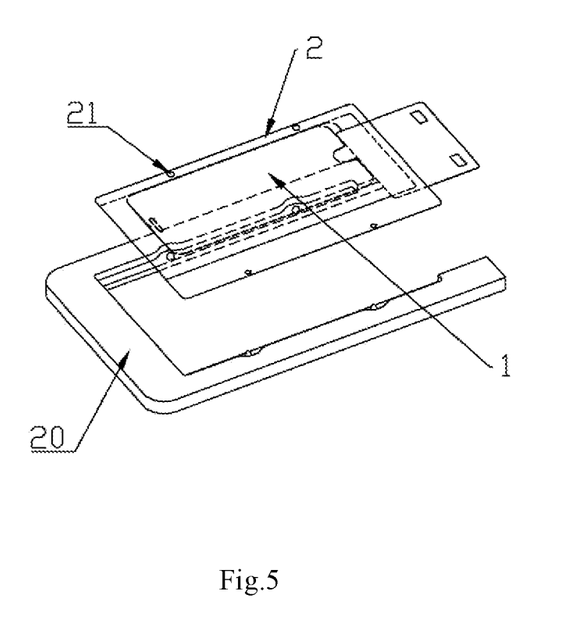
FIG. 5 is a schematic diagram of a state in which the protective film is positioned in an implementation manner according to an embodiment of the present disclosure.
Figure 6:
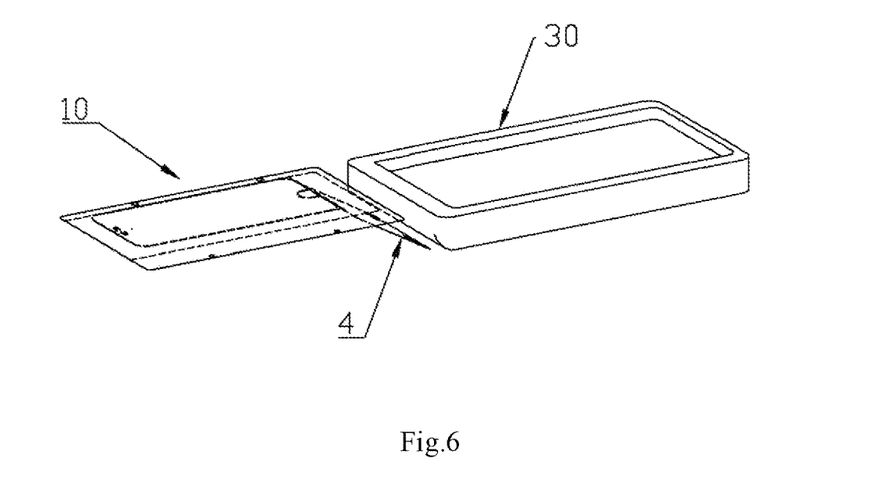
FIG. 6 is a schematic diagram of a state in which a peeling device presses down a lead tab in an implementation manner according to an embodiment of the present disclosure.
Figure 7:
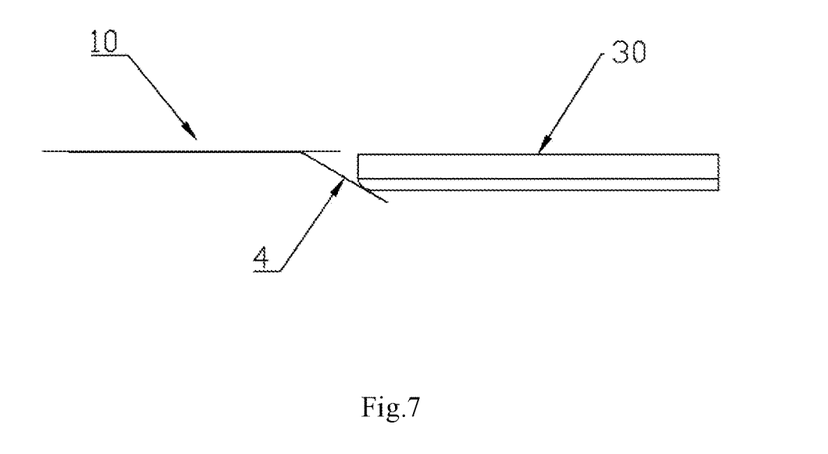
FIG. 7 is a front view of the embodiment of FIG. 6.
Figure 8:
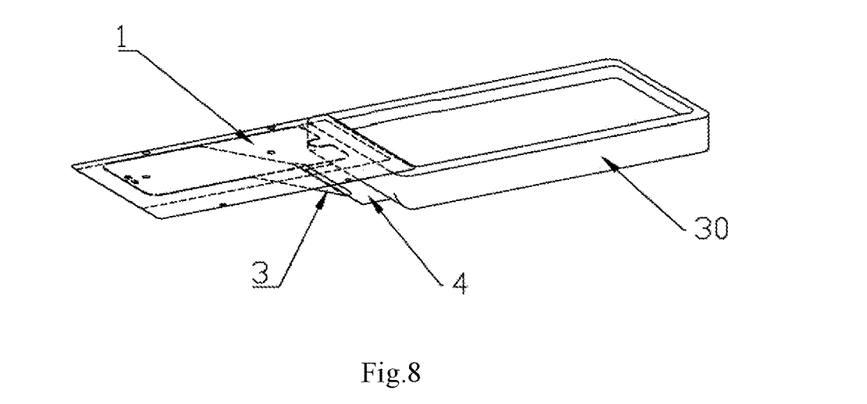
FIG. 8 is a schematic diagram of a state in which the peeling device moves relative to one end of a protective film sheet away from the lead tab and presses down the release layer in an implementation manner according to an embodiment of the present disclosure.
Figure 9:
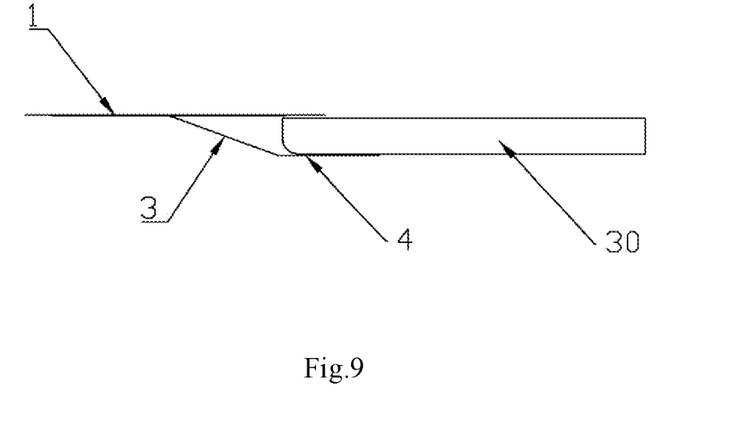
FIG. 9 is a front view of the embodiment of FIG. 8.
Figure 10:
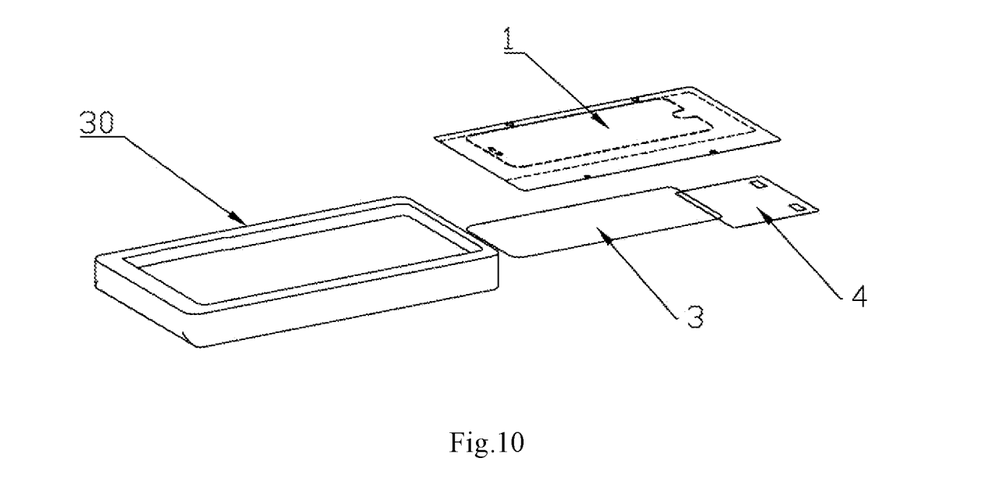
FIG. 10 is a schematic diagram of a state in which the release layer is completely peeled from the protective film sheet in an implementation manner according to an embodiment of the present disclosure.

In a step of S102, a peeling device 30 is provided, the peeling device 30 presses down a lead tab 4 to peel the lead tab from the protective film 10. As shown in FIG. 5 and FIG. 6, when the lead tab 4 is peeled from the protective film 10, a release layer 3 will have a bending and deformation tendency, so that the release layer 3 is peeled from a protective film sheet 1 more easily.

In a step of S103, a peeling device 30 moves relative to one end of the protective film sheet 1 away from the lead tab 4 and presses down the release layer 3 to peel the release layer 3 from the protective film sheet 1. As shown in FIG. 7 to FIG. 10, the peeling device 30 drives the release layer 3 to be gradually peeled from the protective film sheet 1 while moving relative to the protective film sheet 1 and pressing down. Preferably, as shown in FIG. 11, an aligning mechanism 43 maintains a matching state with an aligning device 40 during movement of the peeling device 30, and positions the lead tab 4 and the release layer 3, so as to avoid the release layer 3 from disengagement or bending and jumping during peeling, which affects the quality of peeling.

Figure 13:
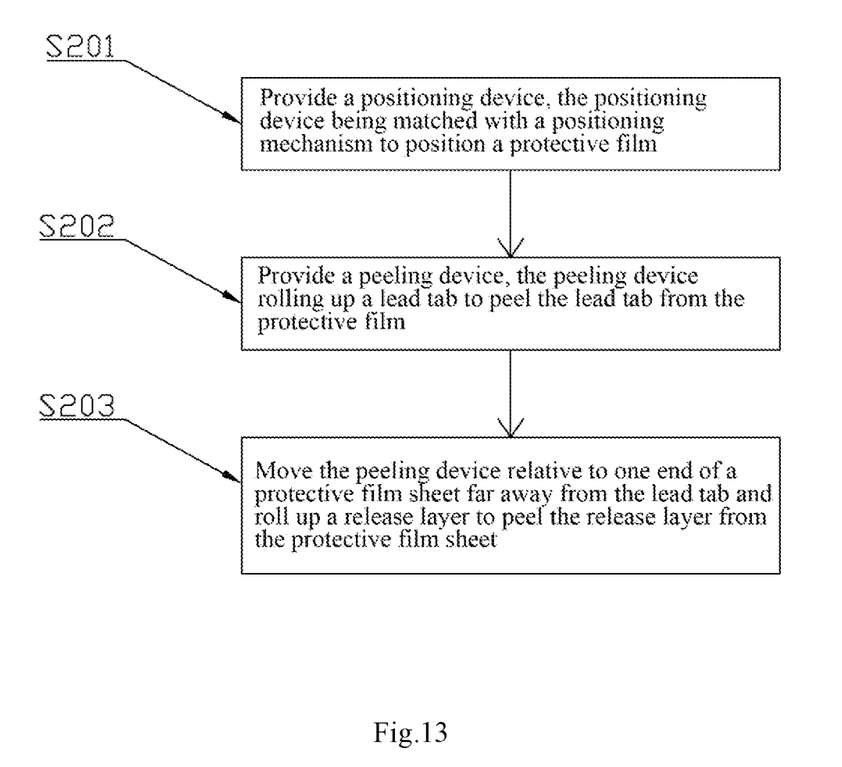
FIG. 13 is a flow chart of a method for peeling a release layer of a protective film according to another embodiment of the present disclosure.

FIG. 13 shows a method for peeling a release layer of a protective film according to another embodiment of the present disclosure. The method includes the following steps.

In a step of S201, a positioning device 20 is provided, and the positioning device 20 is matched with a positioning mechanism 21 to position the protective film 10.

Figure 14:
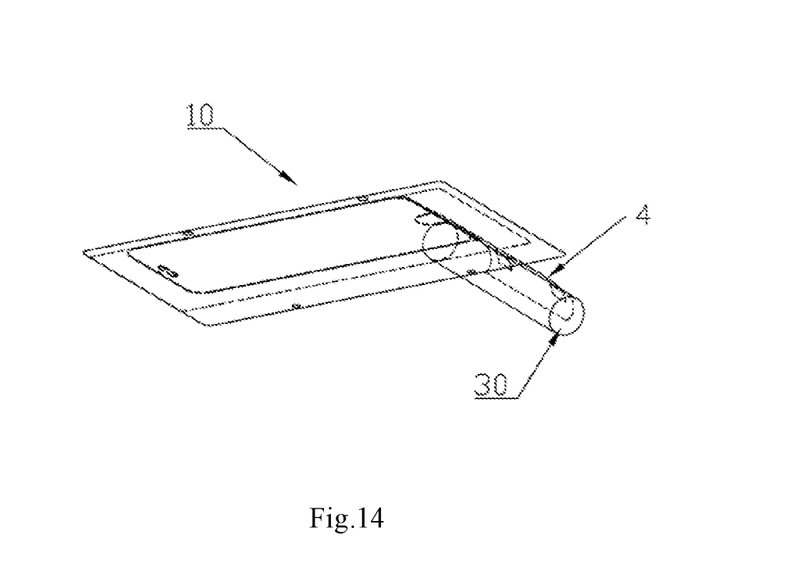
FIG. 14 is a schematic diagram of a state in which the peeling device rolls up the lead tab in another implementation manner according to an embodiment of the present disclosure.
Figure 15:
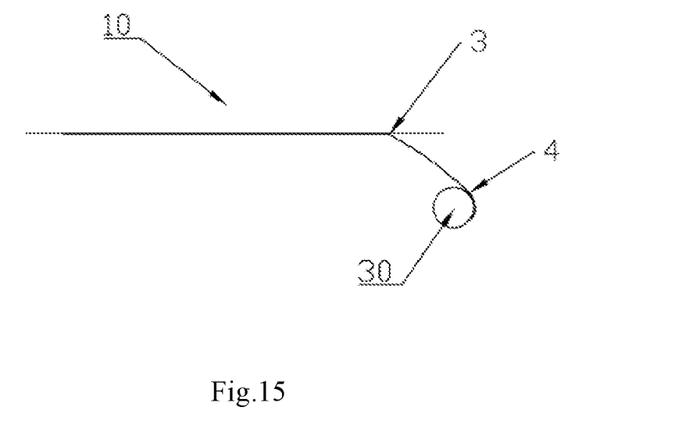
FIG. 15 is a front view of the embodiment of FIG. 14.
Figure 16:
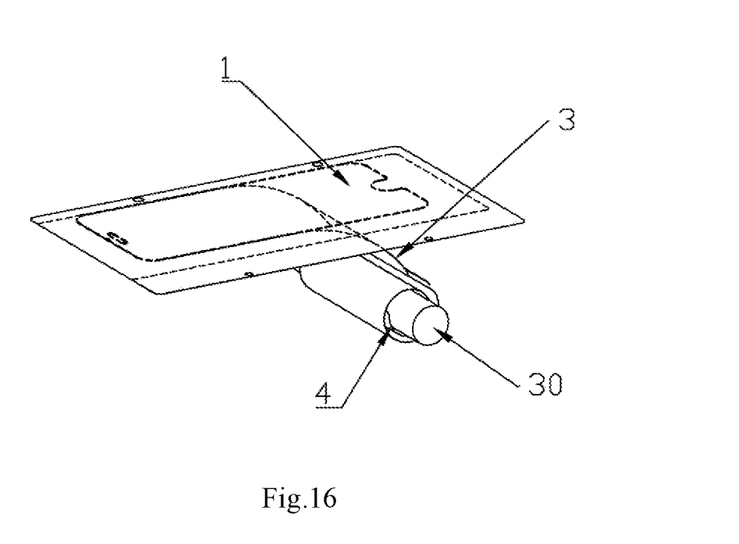
FIG. 16 is a schematic diagram of a state in which the peeling device moves relative to one end of the protective film sheet away from the lead tab and rolls up the release layer in another implementation manner according to an embodiment of the present disclosure.
Figure 17:
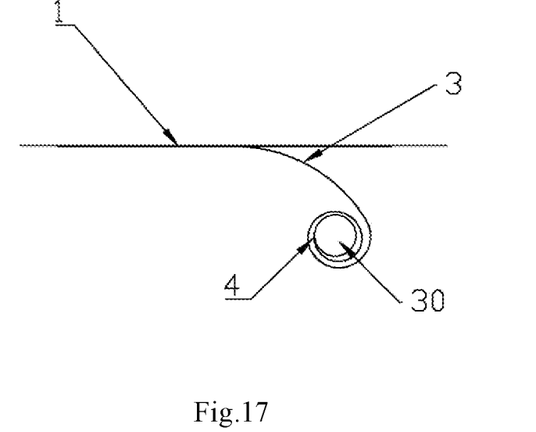
FIG. 17 is a front view of the embodiment of FIG. 16.
Figure 18:
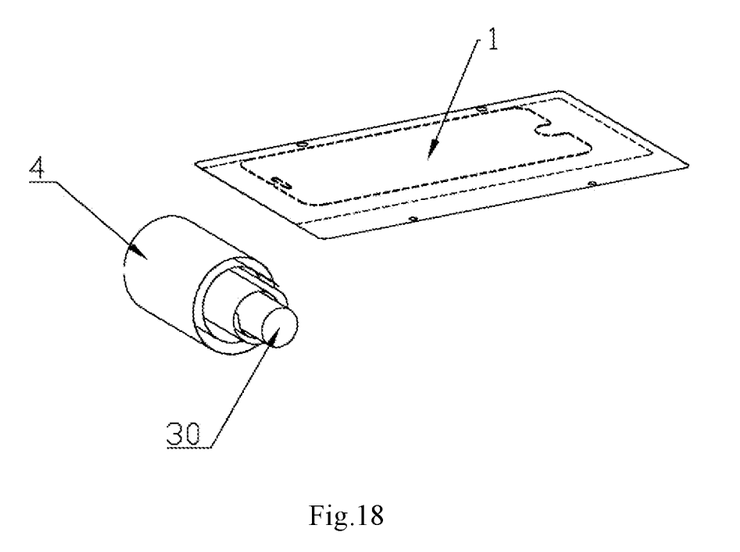
FIG. 18 is a schematic diagram of a state in which the release layer is completely peeled from the protective film sheet in another implementation manner according to an embodiment of the present disclosure.
Figure 19:
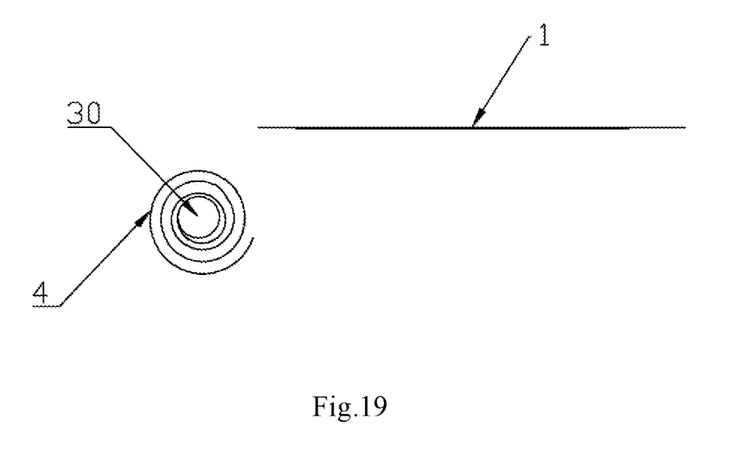
FIG. 19 is a front view of the embodiment of FIG. 18.

In a step of S202: a peeling device 30 is provided, and the peeling device 30 rolls up a lead tab 4 to peel the lead tab from the protective film 10. As shown in FIG. 14 and FIG. 15, the peeling device 30 is a roller, the roller and/or the lead tab 4 are adhesive, the roller and the lead tab are adhered to each other when in contact, and the roller rolls up the lead tab 4.

In a step of S203, a peeling device 30 moves relative to one end of a protective film sheet 1 away from the lead tab 4 and rolls up the release layer 3 to peel the release layer 3 from the protective film sheet 1. As shown in FIG. 14 to FIG. 19, the roller moves relative to the protective film sheet 1 and rolls up the release layer 3, so that the release layer 3 is gradually peeled from the protective film sheet 1.

According to the method for peeling the release layer of the protective film in the embodiment of the present disclosure, a process of peeling the release layer 3 is smoother and more efficient, thereby further increasing an efficiency and the quality of film pasting.

The specific structures described above illustrate preferred embodiments of the present disclosure, but is not intended to limit the implementation manner and the protection scope of the present disclosure. Those skilled in the art may also make various equivalent modifications or substitutions without departing from the spirit of the present disclosure, and these equivalent modifications or substitutions are all included in the scope defined by the claims of the present application.

What is claimed is:

1. A method for peeling a release layer of a protective film, comprising:
   providing a positioning device, the positioning device being matched with a positioning mechanism to position the protective film;
   providing a peeling device, the peeling device peeling a lead tab from the protective film; and
   moving the peeling device relative to the protective film to peel the release layer from a protective film sheet;
   wherein, the protective film comprises:
   the protective film sheet;
   a protective layer; and
   the release layer,
   wherein the lead tab is connected to an end part of the release layer, and the positioning mechanism is arranged on the protective layer to align the protective film sheet with a screen of an electronic device; and
   the lead tab comprises a first layer and a second layer, one end of the release layer is sandwiched between the first layer and the second layer, and one end of the lead tab matched with the release layer is offset from a boundary of the protective film sheet.

2. The method of claim 1, wherein moving the peeling device relative to the protective film to peel the release layer from the protective film sheet comprises: moving the peeling device relative to one end of the protective film sheet away from the lead tab and pressing down the release layer to peel the release layer from the protective film sheet.

3. The method of claim 1, wherein moving the peeling device relative to the protective film to peel the release layer from the protective film sheet comprises: moving the peeling device relative to one end of the protective film sheet away from the lead tab and rolling up the release layer to peel the release layer from the protective film sheet.

4. The method of claim 1, wherein an aligning mechanism is arranged on the lead tab.

5. The method of claim 4, wherein the aligning mechanism is arranged at one end of the lead tab away from the release layer.

6. The method of claim 1, wherein the positioning mechanism comprises a plurality of positioning holes arranged at intervals along a periphery of the protective film sheet for positioning the protective film.

7. The method of claim 6, wherein the plurality of positioning holes are asymmetrically arranged with each other.

8. The method of claim 6, wherein the plurality of positioning holes comprise at least two diameters and are arranged in an array with each other.

* * * * *